United States Patent
Akkiraju et al.

(10) Patent No.: US 11,206,227 B2
(45) Date of Patent: *Dec. 21, 2021

(54) CUSTOMER CARE TRAINING USING CHATBOTS

(71) Applicant: International Business Machines Corporation, Armonk, NY (US)

(72) Inventors: Rama Kalyani T. Akkiraju, Cupertino, CA (US); Jalal U. Mahmud, San Jose, CA (US); Vibha S. Sinha, Santa Clara, CA (US); Anbang Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 423 days.

This patent is subject to a terminal disclaimer.

(21) Appl. No.: 15/813,224

(22) Filed: Nov. 15, 2017

(65) Prior Publication Data

US 2019/0109803 A1 Apr. 11, 2019

Related U.S. Application Data

(63) Continuation of application No. 15/725,613, filed on Oct. 5, 2017.

(51) Int. Cl.
*G09B 19/00* (2006.01)
*H04L 12/58* (2006.01)
(Continued)

(52) U.S. Cl.
CPC ............. *H04L 51/02* (2013.01); *G09B 5/02* (2013.01); *G09B 5/04* (2013.01); *G09B 19/00* (2013.01);
(Continued)

(58) Field of Classification Search
None
See application file for complete search history.

(56) References Cited

U.S. PATENT DOCUMENTS

| 6,965,868 B1 | 11/2005 | Bednarek |
| 7,305,345 B2 | 12/2007 | Bares et al. |

(Continued)

FOREIGN PATENT DOCUMENTS

WO 2007106113 A2 9/2007

OTHER PUBLICATIONS

Bertuzzi, Trish, "Why are 50% of Sales Reps Missing Quota?!", Wed, Aug. 18, 2010, The Bridge Group, Inc., 3 pages, Copyright © 2017, <https://blog.bridgegroupinc.com/blog/tabid/47760/bid/13823/Why-are-50-of-Sales-Reps-Missing-Quota.aspx>.

Geverts, Magnus, "Chatbots—The Next Step in the Evolution of the Contact Center", Apr. 6, 2017, Sponsored by Teleopti, 4 pages, <https://blog.contactcenterpipeline.com/2017/04/chatbots-the-next-step-in-the-evolution-of-the-contact-center/>.

(Continued)

*Primary Examiner* — Bruk A Gebremichael
(74) *Attorney, Agent, or Firm* — William H. Hartwell (57) ABSTRACT

A system, computer program product, and method are disclosed. In an approach to train customer service agent using chatbots. The method includes training a chatbot for a customer chat simulation based on a customer service conversation data, a task scenario, and a customer persona. The method also includes monitoring an interaction between a customer service agent and the chatbot. The method further includes determining an assessment of the performance of the customer service agent based on the interaction between the customer service agent and the chatbot. The method additionally includes generating feedback for the customer service agent based on the assessment of the performance of the customer service agent.

17 Claims, 6 Drawing Sheets

(51) Int. Cl.
  *G09B 5/02* (2006.01)
  *G09B 5/04* (2006.01)
  *H04M 3/51* (2006.01)
  *H04M 3/22* (2006.01)

(52) U.S. Cl.
  CPC ...... *G09B 19/0053* (2013.01); *H04M 3/2227* (2013.01); *H04M 3/51* (2013.01); *H04M 2203/401* (2013.01); *H04M 2203/403* (2013.01)

(56) References Cited

U.S. PATENT DOCUMENTS

| | | |
|---|---|---|
| 8,023,636 B2 | 9/2011 | Koehler et al. |
| 8,094,790 B2 | 1/2012 | Conway et al. |
| 9,401,990 B2 | 7/2016 | Teitelman et al. |
| 2007/0011005 A1 | 1/2007 | Morrison |
| 2008/0201199 A1 | 8/2008 | Armstrong et al. |
| 2010/0010872 A1 | 1/2010 | Drummond et al. |
| 2016/0189558 A1 | 6/2016 | McGann et al. |
| 2016/0342911 A1 | 11/2016 | Kannan et al. |
| 2016/0352658 A1 | 12/2016 | Capper et al. |
| 2017/0323636 A1 | 11/2017 | Xiao |
| 2017/0324867 A1 | 11/2017 | Tamblyn |
| 2018/0096617 A1 | 4/2018 | Tapuhi |
| 2018/0329884 A1 | 11/2018 | Xiong |
| 2019/0188590 A1 | 6/2019 | Wu |

OTHER PUBLICATIONS

Parasuraman et al., "Understanding Customer Expectations of Service", Sloan Management Review, pp. 39-48, Spring 1991, 32, 3, ABI/INFORM Global.

Rose, Ed and Wright, Gillian, "Satisfaction and dimensions of control among call centre customer service representatives", Published online: Feb. 17, 2007, Abstract Only, The International Journal of Human Resource Management, vol. 16, 2005—Issue 1, 6 pages, dx.doi.org/10.1080/0958519042000295000.

Wysocki et al., "Customer Complaints and Types of Customers 1", (1. This document is HR005, one of a series of the Food and Resource Economics Department, UF/IFAS Extension. Original publication date May 2001. Revised Oct. 2015. Visit the EDIS website at http://edis.ifas.ufl.edu.), University of Florida, IFAS Extension, HR005, 2 pages.

Xu et al., "A New Chatbot for Customer Service on Social Media", Chatbot Interfaces, CHI 2017, May 6-11, 2017, Denver, CO, USA, pp. 3506-3510, © 2017 ACM, ISBN 978-1-4503-4655-9/17/05, DOI: http://dx.doi.org/10.1145/3025453.3025496.

Akkiraju et al., "Customer Care Training Using Chatbots", U.S. Appl. No. 15/725,613, filed Oct. 5, 2017, 32 pages.

IBM, "List of IBM Patents or Patent Applications Treated as Related", Appendix P, 2 pages, dated Nov. 27, 2017.

Sabuncuoglu et al., "Job shop scheduling with beam search", European Journal of Operational Research 118 (1999), pp. 390-412, Received Jul. 1, 1997, accepted Aug. 1, 1998, in Non-Final Office Action dated Feb. 16, 2021.

CUSTOMER CARE TRAINING USING CHATBOTS

BACKGROUND OF THE INVENTION

The present invention relates generally to the field of chatbots, and more particularly to customer care training using chatbots.

The term chatbot refers to a computer program that provides automated conversations with humans. Chatbots offer conversational experiences by interpreting human natural language input and generating one or more responses. Chatbots translate natural language input using natural language processing (NLP) methods and often generate responses based on machine learning constructs, such as supervised and/or unsupervised learning methods. Using these methods, chatbots can interpret natural language to analyze and extract open and/or closed questions, sentiment, conference, ambiguity, text structures, summarizations, and other natural language processing tasks from text, speech, and/or images.

SUMMARY

Embodiments of the present invention disclose a method, a computer program product, and a system for training a customer service agent using chatbots. The method may include one or more processors training a chatbot for a customer chat simulation based on a customer service conversation data, a task scenario, and a customer persona. The method may further include one or more processors monitoring an interaction between a customer service agent and the chatbot. The method may additionally include one or more processors determining an assessment of the performance of the customer service agent based on the interaction between the customer service agent and the chatbot. The method may further include generating feedback for the customer service agent based on the assessment of the performance of the customer service agent.

DETAILED DESCRIPTION

Customer service is the bridge between an organization and its current and potential customers. If an organization wants to improve the quality of its customer service, the efforts must begin with the training of the service agents. Many organizations spend tremendous resources to provide extensive training to their agents pertaining to products, services, and guidelines for dealing with concerns and requests from customers. However, current training practices fail to include situational feedback for customer service agents in a cost-effective environment.

Embodiments of the present invention recognize that simulation of customer styles and behaviors as well as offering situational feedback may be advantageous for customer service agent training. Embodiments of the present invention further recognize that customer service interaction data may be used to determine a chatbot behavior and responses. Embodiment of the present invention additionally recognize that customer service agent training may be performed by using a chatbot for customer simulation. Embodiments of the present invention additionally recognize that providing an assessment of the performance of a customer service agent based on interaction with the customer simulation may increase the uniformity of customer service agent responses and styles by allowing the company to provide situational feedback to the customer service agent based on the assessment.

Implementation of embodiments of the invention may take a variety of forms, and exemplary implementation details are discussed subsequently with reference to the Figures.

Figure 1:
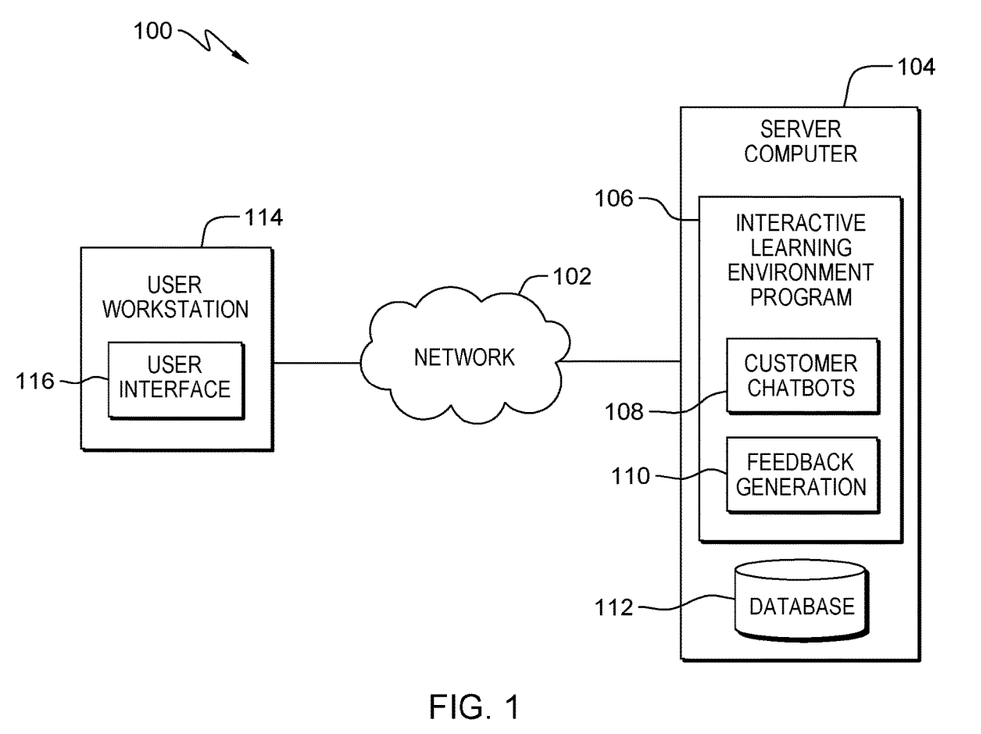
FIG. 1 is a block diagram view of an embodiment of a system, according to the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and user workstation 114, all interconnected over network 102.

In general, network 102 can be any combination of connections and protocols that will support communications between server computer 104 and user workstation 114, and other computing devices (not shown) within distributed data processing environment 100. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that can receive and transmit data, voice, and/or video signals, including multimedia signals that include voice, data, and video information.

Server computer 104 can be a standalone computing device, a management server, a content services, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any other programmable electronic device capable of communicating user workstation 114, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 may include internal and external hardware components, as depicted and described in further detail with respect to FIG. 4.

Database 112 is a repository for data used by integrated learning environment program 106. Data used by integrated learning environment program 106 may include customer service interaction data. In the depicted embodiment, database 112 resides on server computer 104. Customer service interaction data may include text and/or speech conversations between customers and customer service agents. Customer service interaction data may further include contextual information such as social media profiles and demographics data, among others. Customer service interaction data may be collected from customer service call centers, social media, and/or any other source of conversations between customers and customer service agents. In another embodiment, database 112 may reside elsewhere within distributed data processing environment 100 provided integrated learning environment program 106 has access to database 112.

User workstation 114 enables a user to log-in and interact with integrated learning environment program 106 on server computer 104. In some embodiments of the present invention, user workstation 114 is a device that performs programmable instructions. For example, user workstation 114 can be a laptop computer, a tablet computer, a smart phone, or any programmable electronic mobile device capable of communicating with various components and devices within distributed data processing environment 100, via network 102. In general, user workstation 114 represents any programmable electronic mobile device or combination of programmable electronic mobile devices capable of executing machine readable program instructions and communicating with other computing devices (not shown) within distributed data processing environment 100 via a network, such as network 102. User workstation 114 includes an instance of user interface 116.

User interface 116 provides an interface to integrated learning environment program 106 on server computer 104 for a user of user workstation 114. In some embodiments of the present invention, user interface 116 may be a graphical user interface (GUI) or a web user interface (WUI) and can display text, documents, web browser windows, user options, application interfaces, instructions for operation, and include the information (such as graphic, text, and sound) that a program presents to a user and the control sequences the user employs to control the program. In other embodiments, user interface 116 may also be mobile application software that provides an interface between a user of user workstation 114 and server computer 104. Mobile application software, or an "app," is a computer program designed to run on smart phones, tablet computers, and other mobile devices. User interface 116 enables the user of user workstation 114 to receive customer service agent training on integrated learning environment program 106. In accordance with some embodiments, users receive training on integrated learning environment program 106 by interaction with user interface 116, which may include touch screen devices, audio capture devices, and other types of user interfaces. In other embodiments, user interface 116 may be an external device operatively connected to user workstation 114 via near-field communication or other types of wired and/or wireless technologies.

Figure 5:
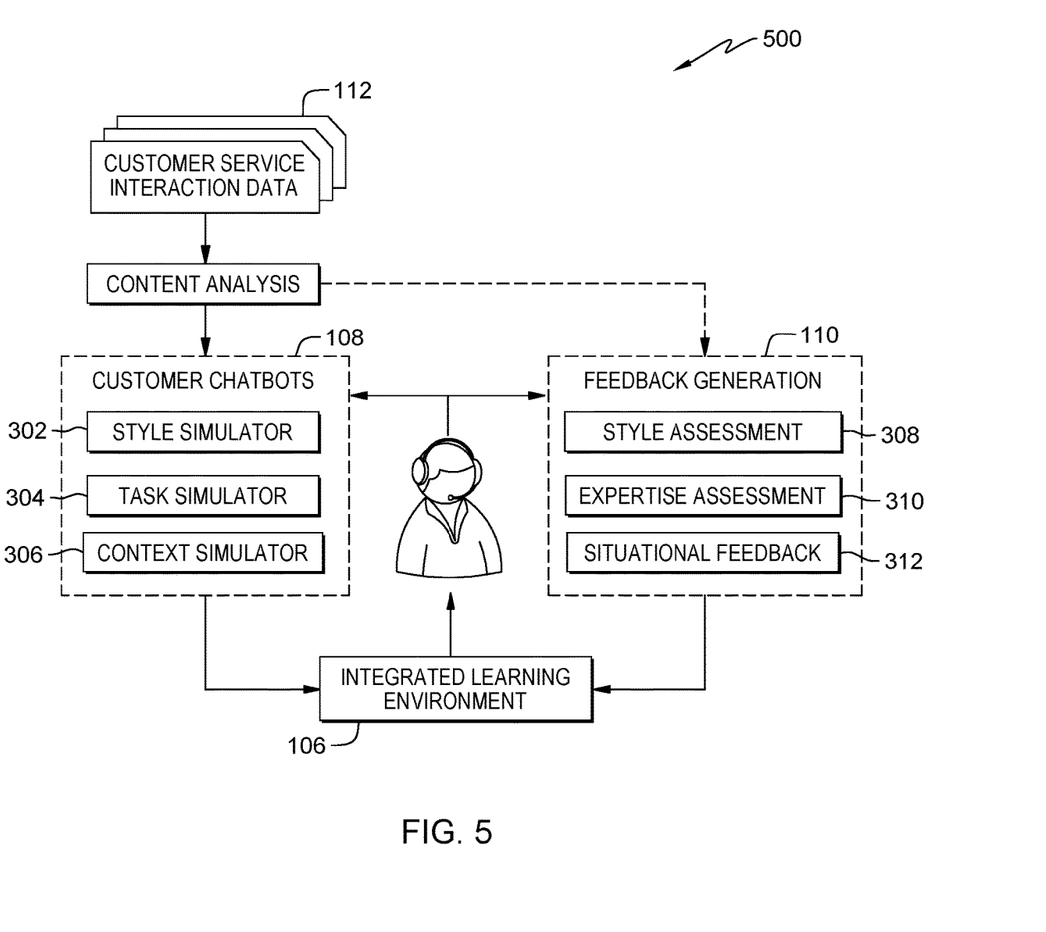
FIG. 5 depicts a block diagram of an embodiment, according to the present invention.

Server computer 104 includes integrated learning environment program 106 to train customer service agents using chatbots (see FIG. 5, block diagram 500). Integrated learning environment program 106 receives customer service interaction data and provides a simulated natural learning environment for training customer service agents. In some embodiments of the present invention, integrated learning environment program 106 consists of a customer chatbots module 108 and a feedback generation module 110.

Customer chatbots module 108 simulates different types of customers in different task scenarios. In some embodiments of the present invention, customer chatbots module 108 includes style simulator module 302, task simulator module 304, and context simulator module 306 (see FIG. 3). In some embodiments, the types of customer chatbots styles can be built as a bottom-up taxonomy derived from the customer service interaction data by performing unsupervised machine learning methods to extract tone and persona styles manifested in the customer service interaction data. In other embodiments, customer chatbots module 108 can learn a pre-defined top-down taxonomy of styles in a supervised machine learning fashion using annotated customer service interaction data.

In an exemplary embodiment, customer chatbots module 108 may include a taxonomy of five chatbots persona styles. In this exemplary embodiment, customer chatbots module 108 may include a first customer chatbot that may attempt to avoid confrontation and explicitly avoid making its complaints known at the time. Customer service agents may be trained to proactively initiate the conversation to solicit comments and complaints from the first customer chatbot. After identifying the comments and complaints from the first customer chatbot, customer service agents are directed to address the comments and complaints.

Continuing our exemplary embodiment, customer chatbots module 108 may include a second customer chatbot that may attempt to complain loudly and at length. The second customer chatbot may likely not respond well to reasons or perceived excuses about why the product or service is unsatisfactory. Customer service agents may be trained to listen patiently, carefully agree with the chatbot, and carefully indicate options to address the problem.

In this exemplary embodiment, customer chatbots module 108 may also include a third customer chatbot simulating customers who expect high-end, absolute best products, and are willing and able to pay for these products. The third customer chatbot may be designed to complain in a moderate manner and may not be interested in what may be perceived to be excuses or explanations. Customer service agents may be trained to identify the third customer chatbot and to provide options to acquire or upgrade to the best products or services available.

Continuing our exemplary embodiment, customer chatbots module 108 may also include a fourth customer chatbot that may not have a complaint to solve but rather attempts to gain things (e.g., refunds, free products, etc.) that it is not entitled to have. Customer service agents may be trained to identify the fourth customer chatbot and to apply company anti-fraud policies.

In this exemplary embodiment, customer chatbots module 108 may further include a fifth customer chatbot that simulates a repeat customer that can never be satisfied. Customer service agents may be trained to identify the fifth customer chatbot and listen patiently.

In some embodiments of the present invention, customer chatbots module 108 may apply statistical machine learning techniques and/or deep learning techniques to simulate customer requests and customer responses. The additional information, such as customer persona, task, and context, may be considered, at least in part, in three possible ways: (i) customer chatbots module 108 may generate multiple responses and select at least one response according to the target style, tone, or persona (e.g., by performing a beam search); (ii) customer chatbots module 108 may include a separate method to modify generated responses (e.g., sequence-to-sequence model, word-graph construction approach, multi-sentence compression, among others); and (iii) customer chatbots module 108 may include models to directly consider the persona, task, and context as additional constraints in the response generation (e.g., in sequence-to-sequence learning with neutral networks, word embedding can be trained directly to learn constraints for response generation).

Figure 3:
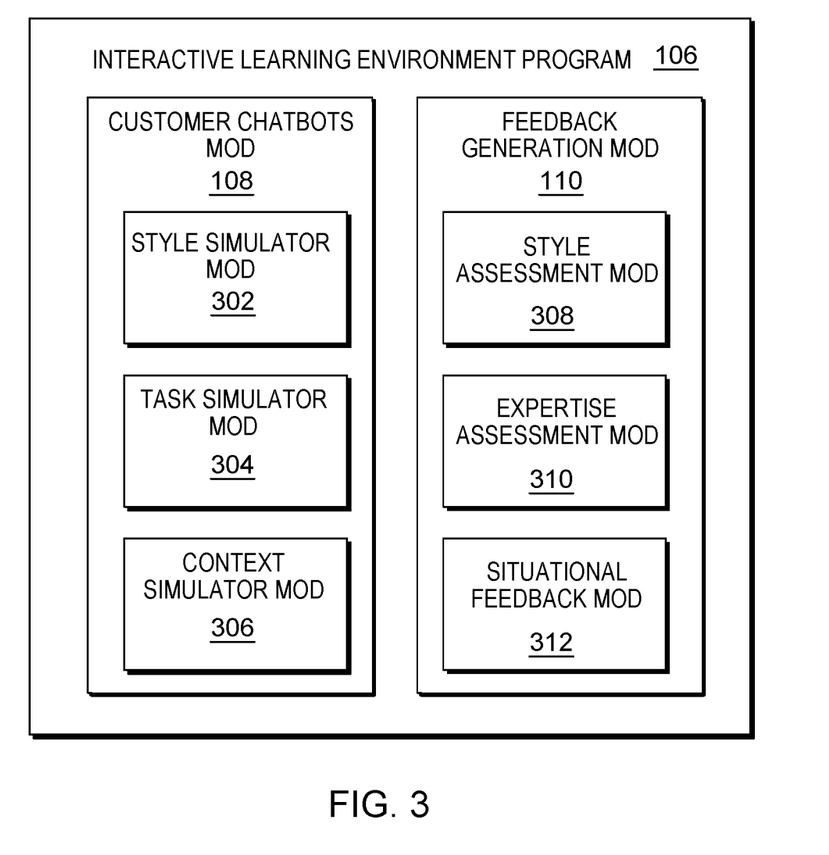
FIG. 3 is a block diagram showing a machine logic (for example, software) portion of an embodiment of the present invention.

Feedback generation module 110 provides feedback to the customer service agents by continuous assessment of the style and performance of the interaction of customer service agents and the customer chatbots module 108. In some embodiments of the present invention, feedback generation module 110 includes style assessment module 308, expertise assessment module 310, and situational feedback module 312.

In some embodiments, feedback generation module 110 includes style assessment module 308 that allows organizations to define target customer service styles. In some embodiments, feedback generation module 110 allows quantitatively measuring target customer service styles using a supervised or semi-supervised machine learning method to assess styles represented in a conversation. In these embodiments, crowdsourcing or any other suitable methods may be used to label a subset of the customer service interaction data with a number of style attributes. In other embodiments, the styles of customer service agents may be derived from the customer service interaction data by an unsupervised machine learning method.

In an exemplary embodiment, feedback generation module 110 may include a taxonomy of four customer service agent styles. In this exemplary embodiment, feedback generation module 110 may include a first customer service style where customer service agents are trained to observe more than they talk. In some embodiments, the first customer service style directs customer service agents to be patient and offer specific and complete explanations to the questions and concerns of the customer chatbot.

Continuing our exemplary embodiment, feedback generation module 110 may include a second customer service style where customer service agents are trained to look for opportunities to socialize with customers. In some embodiments, the second customer service style directs customer service agents to be enthusiastic when communicating with customers.

In another aspect of our exemplary embodiment, feedback generation module 110 may include a third customer service style where customer service agents are trained to be conservative and formal. In some embodiments, the third customer service style directs customer service agents to carry on lengthy conversations when attempting to get answers to questions. In some embodiments, the third customer service style may further direct customer service agents to heavily rely on practical information such as times, dates, and other verifiable data to inform their decisions to the customer.

In this exemplary embodiment, feedback generation module 110 may further include a fourth customer service style where customer service agents are trained to work proactively toward a solution to the questions or concerns of the customer. In some embodiments, the fourth customer service style directs customer service agents to display a confident demeanor. In some embodiments, customer service agents are trained to ask specific, direct questions and offer short, straight answers.

In some embodiments of the present invention, feedback generation module 110 may assess the progress of the customer service agent and provide situational feedback to help agents better engage with a simulated customer. In some embodiments of the present invention, feedback generation module 110 includes expertise assessment module 310 to assess the training progress of customer service agents. In some embodiments of the present invention, feedback generation module 110 evaluates the performance of an agent ranging from utterance level to task level.

In an exemplary embodiment, feedback generation module 110 performs expertise assessment by applying a sequence-to-sequence model to automatically generate agent responses to address customer requests. In this exemplary embodiment, feedback generation module 110 computes the similarity between the responses generated by the model and the responses provided by the agent by automatic metrics (e.g., BLEU, Tf-idf, word2vec, and other methods for determining text similarity). In another exemplary embodiment, feedback generation module 110 may provide an interface for manual ratings of the expertise level of customer service agents and adopt a supervised method to assess the performance of customer service agents automatically.

In some embodiments of the present invention, feedback generation module 110 includes situational feedback module 312 to provide feedback while considering the style, training level, and performance of customer service agents. For example, if feedback generation module 110 identifies a customer service agent as a low-level trainee, feedback generation module 110 may provide multiple responses (e.g., generated by a sequence-to-sequence model) shown as a multiple-choice question. In this example, feedback generation module 110 may ask the customer service agent to select the best response. In another example, if feedback generation module 110 identifies the customer service agent as a mid-level trainee, feedback generation module 110 may provide a response template. In this example, feedback generation module 110 may ask the customer service agent to fill out the template to respond to the customer request. In yet another example, if feedback generation module 110 identifies the customer service agent as a high-level trainee, feedback generation module 110 may only provide hints such as desired phrases, keywords, and/or topics. In some embodiments, the provided hints may be extracted from generated responses.

In some embodiments of the present invention, customer chatbots module 108 adjusts simulated customer styles and tasks based on the evaluation results of a customer service agent by feedback generation module 110. In some embodiments, customer chatbots module 108 may also provide feedback based on the evaluation results of a customer service agent by feedback generation module 110. For example, if the customer service agent performs below a predetermined threshold, customer chatbots module 108 provides concrete feedback to the customer service agent and reduces the task difficulty. In contrast, if the customer service agent performs above the predetermined threshold, customer chatbots module 108 provides less situational feedback and increases the uncertainty in customer responses simulated by chatbots.

In some embodiments of the present invention, integrated learning environment program 106 may also provide optimal mapping between customer service agents and customers. For example, integrated learning environment program 106 may store the style and performance of a customer service agent with respect to different types of customers and task scenarios during the training process. In some embodiments, the style and performance of a customer service agent can be used as ground truth to learn a customer service routing system to consider the match between the style of a customer service agent and customer personas.

Figure 2:
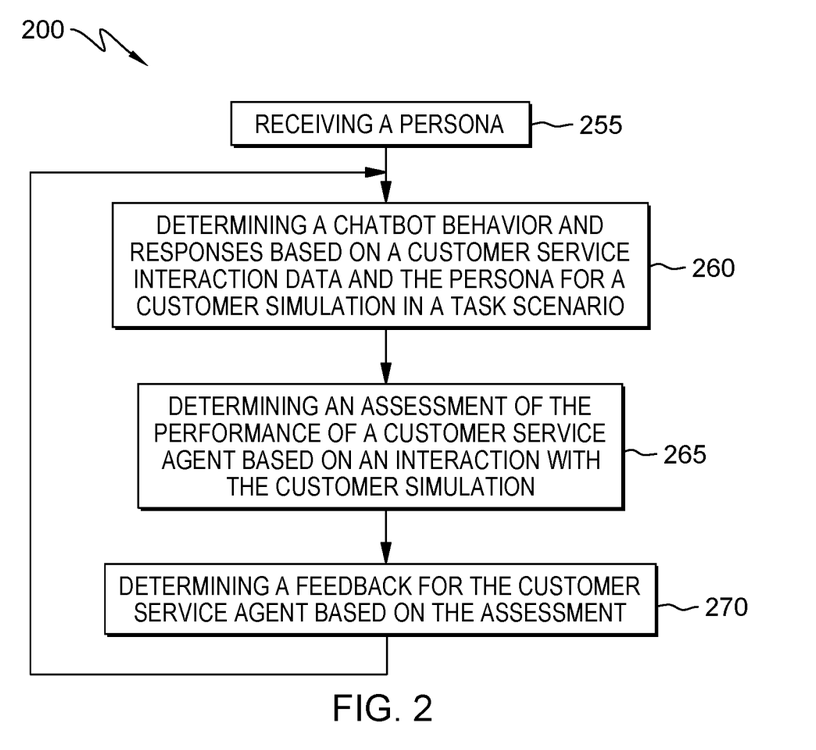
FIG. 2 is a flowchart showing an embodiment of a method for training customer service agents using chatbots.

Integrated learning environment program 106 is depicted and described in further detail with respect to FIG. 2. Referring to flowchart 200, integrated learning environment program 106 provides a simulated learning environment for customer service agents training using customer chatbots.

Processing begins at operation 255, where integrated learning environment program 106 receives a customer persona. In some embodiments of the present invention, the types of customer chatbots styles can be built as a bottom-up taxonomy derived from the customer service interaction data by performing unsupervised machine learning methods to extract tone and persona styles manifested in the customer service interaction data. In other embodiments, customer chatbots module 108 can learn a pre-defined top-down taxonomy of styles in a supervised machine learning fashion using annotated customer service interaction data. In some embodiments, the persona may be a taxonomy of five customer chatbots as described in this disclosure.

In an exemplary embodiment, integrated learning environment program 106 receives a persona corresponding to the first customer chatbot (i.e., a chatbot that attempts to avoid confrontation and explicitly avoid making its complaints known at the time).

Processing continues at operation 260, where integrated learning environment program 106 determines a chatbot behavior and responses using a customer service interaction data and the persona. In some embodiments of the present invention, the chatbot behavior and responses are determined for a customer simulation in a task scenario. In some embodiments, customer chatbots module 108 may apply statistical machine learning techniques and/or deep learning techniques to simulate customer behavior and customer responses. In some embodiments, the customer persona, task, and context may be considered for chatbot behavior and responses as follows: (i) generate multiple responses and select at least one response according to the target style, tone, or persona; (ii) generate responses based on sequence-to-sequence model, word-graph construction approach, multi-sentence compression approach, or any other suitable model for generating responses; and (iii) include models to directly consider the persona, task, and context as additional constraints such as word embedding in a sequence-to-sequence model.

Continuing our exemplary embodiment, integrated learning environment program 106 determines a chatbot behavior based on customer service interaction data and the persona corresponding to the first customer chatbot for training of a customer service agent named Ben. In this exemplary embodiment, the task scenario includes an airline customer in an international flight schedule where the first flight has been delayed. In this exemplary embodiment, the chatbot initiates the training by sending the message "My flight is Delayed!" to Ben. Ben sends the message "I am sorry to hear that. I am here to help. What's your flight number?" in reply.

Processing continues at operation 265, where integrated learning environment program 106 determines an assessment of the performance of a customer service agent based on an interaction with the customer simulation. In some embodiments of the present invention, integrated learning environment program 106 provides a supervised method to assess the performance of customer service agents automatically by providing an interface for manual ratings of the expertise level of customer service agents. In other embodiments, integrated learning environment program 106 determines an assessment of the performance of a customer service agent by applying a sequence-to-sequence model to automatically generate agent responses to address customer requests and determining the similarity between the responses generated by the model and the responses provided by the agent by automatic metrics, such as a BLEU score. In some embodiments, integrated learning environment program 106 may continue processing at operation 260 to determine a chatbot behavior and responses based on the interaction between the chatbot and the customer service agent.

Figure 6:
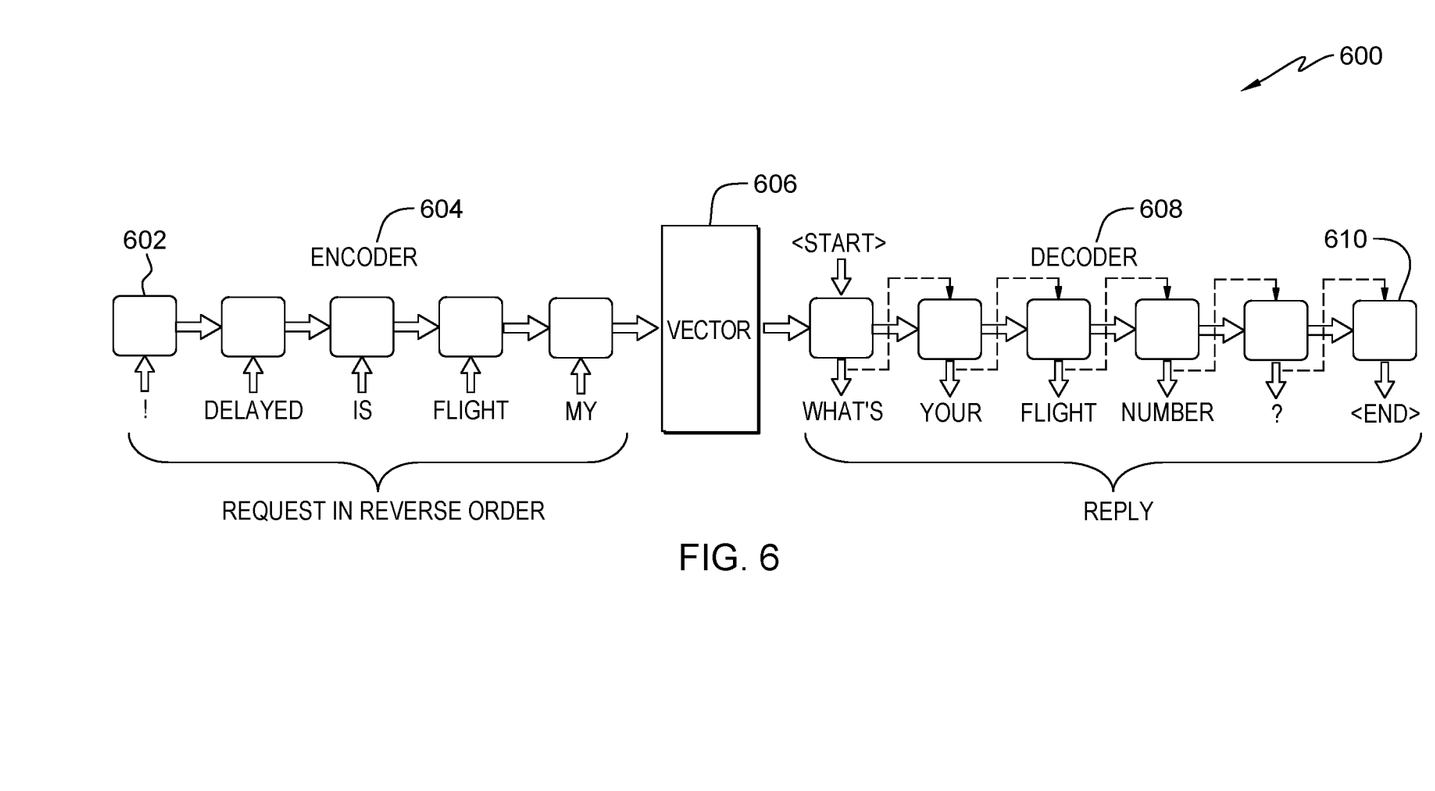
FIG. 6 depicts an exemplary sequence-to-sequence model, according to an embodiment of the present invention.

Continuing our exemplary embodiment (see FIG. 6, element 600) of a sequence-to-sequence model, encoder 604 is a neural network that maps a variable-length input sequence 602 to fixed-length vector 606 and decoder 608 is a neural network that maps fixed-length vector 606 to variable-length output sequence 610. In this exemplary embodiment, a simulated customer sends variable-length input sequence 602 (e.g., "My flight is Delayed!") to the customer service agent. In response to receiving the input sequence 602, decoder 608 generates variable-length output sequence 610 (e.g., "What's your flight number?") as a reply. In this exemplary embodiment, integrated learning environment program 106 then compares the variable-length output sequence 610 with the reply from the customer service agent (e.g., "I am sorry to hear that. I am here to help. What's your flight number?") and generates a score for Ben's performance. In our exemplary embodiment, integrated learning environment program 106 generates a score of 0.8 for the reply provided by Ben.

Processing proceeds at operation 270, where integrated learning environment program 106 determines a feedback for the customer service agent based on the assessment. In some embodiments of the present invention, integrated learning environment program 106 provides feedback by considering the style, training level, and performance of customer service agents (e.g., considering agent responses based on expected skill level of the customer service agent).

Continuing our exemplary embodiment, integrated learning environment program 106 identifies the high score for the provided reply. In this exemplary embodiment, integrated learning environment program 106 may remind Ben that not all customers will be explicit about their concerns and encourages Ben to verify the complete flight schedule to determine the possibility of a missed flight.

Figure 4:
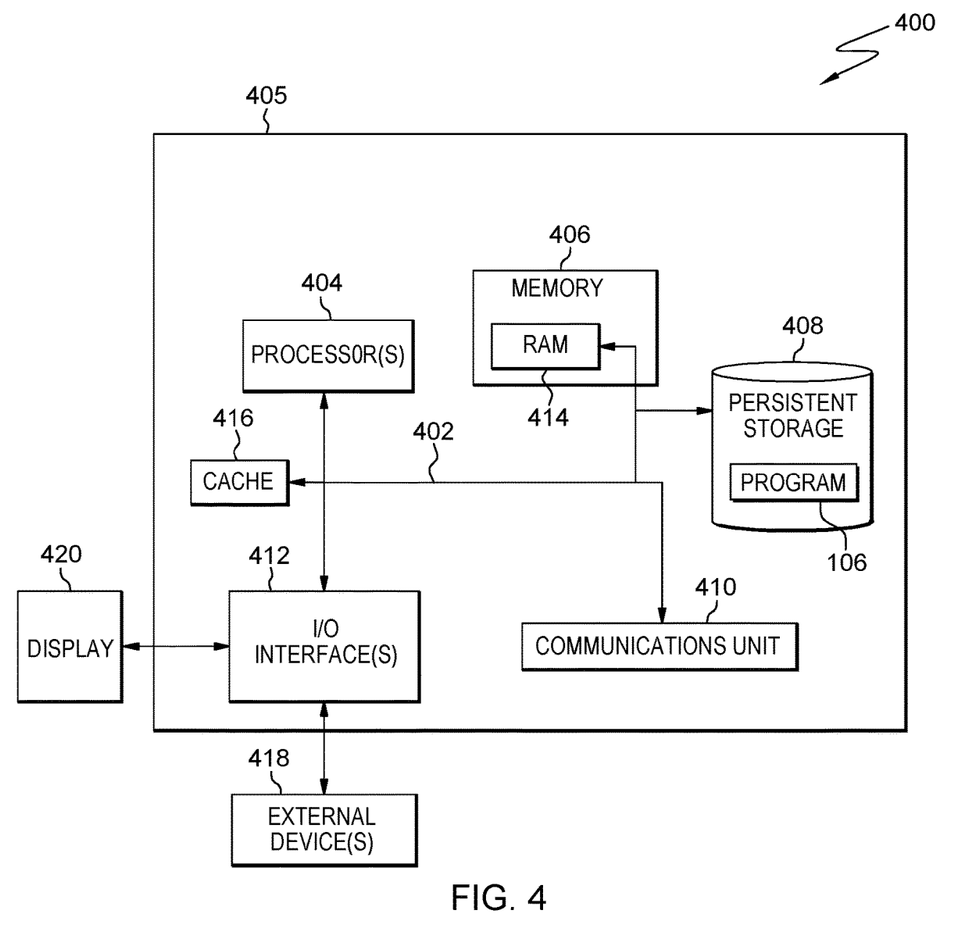
FIG. 4 is a block diagram of components of a computer executing an integrated learning environment program according to the present invention.

FIG. 4 depicts a block diagram 400 of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computing device 405 and server computer 104 include communications fabric 402, which provides communications between computer processor(s) 404, memory 406, persistent storage 408, communications unit 410, and input/output (I/O) interface(s) 412.

Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Integrated learning environment program 106 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Integrated learning environment program 106 may be downloaded to persistent storage 408 through communications unit 410.

I/O interface(s) 412 allows for input and output of data with other devices that may be accessible to computing device 405 and server computer 104, such as user workstation 114, and other computing devices (not shown). For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., integrated learning environment program 106 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    training, by one or more processors, a chatbot for a customer chat simulation based on customer service conversation data, task scenarios, and customer personas;
    monitoring, by the one or more processors, interactions between customer service agents and the chatbot trained for customer chat simulation, wherein the interactions include requests provided by the chatbot and respective responses to the requests provided by the customer service agents in respective customer service agent styles;
    determining, by the one or more processors, model customer service agent responses to the requests using a sequence-to-sequence model, wherein the sequence-to-sequence model receives, as input sequences, the requests in reverse order, and wherein the sequence-to-sequence model generates, as output sequences, the model customer service agent responses;
    determining, by the one or more processors, assessments of the performance of the customer service agents, including respective training levels of the customer service agents, based on comparisons between the respective responses of the customer service agents and the model customer service agent responses;
    generating, by the one or more processors, feedback for the customer service agents based on the assessments of the performance of the customer service agents; and
    matching, by the one or more processors, the customer service agents to respective customers in a customer service routing system using the respective customer service agent styles and the performance of the respective customer service agents as ground truths,
    wherein generating the feedback for the customer service agents includes generating a multiple-choice question for a first customer service agent having a first training level, generating a response template for a second customer service agent having a second training level, and generating a hint, extracted from a model customer service agent response, for a third customer service agent having a third training level.

2. The method of claim 1, wherein determining, by the one or more processors, the model customer service agent responses further comprises:
    determining, by the one or more processors, a plurality of model customer service agent responses for each interaction using the sequence-to-sequence model; and
    selecting, by the one or more processors, a respective model customer service agent response from the plurality of model customer service agent responses based on a target style, a target tone, or a customer persona.

3. The method of claim 1, wherein the sequence-to-sequence model: (i) uses an encoder neural network to map variable length input sequences to fixed length vectors, and (ii) uses a decoder neural network to map the fixed length vectors to variable length output sequences.

4. The method of claim 2, wherein each plurality of model customer service agent responses is based on the respective customer persona, a respective task scenario, and at least one respective context data.

5. The method of claim 4, wherein the respective customer persona, the respective task scenario, and the at least one respective context data for each interaction are applied as additional constraints for word embedding in the sequence-to-sequence model.

6. The method of claim 1, wherein the comparisons between the respective responses and the model customer service agent responses are based, at least in part, on automatic metrics.

7. The method of claim 6, wherein the automatic metrics include a BLEU score.

8. The method of claim 6, wherein the automatic metrics include a Tf-idf score.

9. The method of claim 6, wherein the automatic metrics include a word2vec score.

10. The method of claim 2, wherein the selecting of the respective model customer service agent response from the plurality of model customer service agent responses is based on the target style, wherein the target style is selected from a group of customer chatbot styles, and wherein the group of customer chatbot styles is built as a bottom-up taxonomy by performing unsupervised machine learning to extract customer chatbot styles from the customer service conversation data.

11. The method of claim 2, wherein the selecting of the respective model customer service agent response from the plurality of model customer service agent responses is further based on a beam search.

12. The method of claim 1, wherein the determining of the assessments of the performance of the customer service agents includes comparing the performance of at least one customer service agent to a threshold level of performance.

13. The method of claim 12, further comprising:
determining, by the one or more processors, that the performance of the at least one customer service agent is below the threshold level of performance; and
reducing, by the one or more processors, a difficulty level for training the at least one customer service agent.

14. The method of claim 12, further comprising:
determining, by the one or more processors, that the performance of the at least one customer service agent is above the threshold level of performance; and
increasing, by the one or more processors, a level of uncertainty in responses provided by the chatbot to the at least one customer service agent.

15. The method of claim 1, further comprising:
determining, by the one or more processors, a plurality of model customer service agent responses using a word-graph construction approach.

16. The method of claim 1, further comprising:
determining, by the one or more processors, a plurality of model customer service agent responses using multi-sentence compression.

17. The method of claim 1, wherein the generating of the feedback for the customer service agents further includes asking the first customer service agent to select the best response to the multiple-choice question, asking the second customer service agent to fill out the response template to respond to a customer request, and providing the hint to the third customer service agent.

* * * * *